United States Patent [19]

Hirozawa et al.

[11] 4,210,548
[45] Jul. 1, 1980

[54] HYDROXYBENZOIC ACID AS PH BUFFER AND CORROSION INHIBITOR FOR ANTIFREEZE CONTAINING ORGANOSILOXANE-SILICATE COPOLYMERS

[75] Inventors: Stanley T. Hirozawa, Birmingham, Mich.; Edward F. O'Brien, Cromwell, Conn.; Joe C. Wilson, Belleville, Mich.

[73] Assignee: BASF Wyandotte Corporation, Wyandotte, Mich.

[21] Appl. No.: 350

[22] Filed: Jan. 2, 1979

[51] Int. Cl.² ................................ C09K 15/32
[52] U.S. Cl. ............................ 252/76; 252/73; 252/75; 252/77; 252/78.1; 252/78.3; 252/389 R; 252/396; 422/14
[58] Field of Search .................. 252/75, 76, 77, 73, 252/78.1, 78.3, 396, 389 R; 422/14

[56] References Cited

U.S. PATENT DOCUMENTS

| 2,094,564 | 9/1937 | Schenck et al. | 252/73 |
| 3,341,469 | 9/1967 | Piwes et al. | 252/389 R |

Primary Examiner—Mayer Weinblatt
Attorney, Agent, or Firm—Andrew E. Pierce

[57] ABSTRACT

This invention relates to single-phase antifreeze or coolant concentrates comprising an alcohol, a corrosion inhibiting amount of a water-soluble organosiloxane-silicate copolymer corrosion inhibitor and an organic basic pH buffer capable of buffering pH in the range of about 9 to about 11 comprising a hydroxybenzoic acid or mixtures thereof. The concentrates are used as coolants either undiluted or upon dilution with about 25 percent to about 90 percent by weight of water based upon the total weight of the concentrate. The alcohol is preferably ethylene glycol. The coolant compositions are effective in providing protection against corrosion of all metals and alloys used in industrial heat exchangers are especially effective in inhibiting the corrosion of aluminum internal combustion engine and radiator components.

4 Claims, No Drawings

HYDROXYBENZOIC ACID AS PH BUFFER AND CORROSION INHIBITOR FOR ANTIFREEZE CONTAINING ORGANOSILOXANE-SILICATE COPOLYMERS

BACKGROUND OF THE INVENTION

1. Field of the Invention

This invention relates to alcohol based antifreeze and coolant compositions containing corrosion inhibitors for use primarily in water-circulating systems such as internal combustion engines, heat exchangers, cooling towers, and the like.

2. Description of the Prior Art

Antifreeze concentrates containing alcohols such as ethylene glycol are commonly diluted with water in order to depress the freezing point of water to prepare cooling system compositions for internal combustion engines. It is known that the alcohols utilized gradually decompose in the cooling system to produce acidic products which lower the pH of the coolant. It is also known that metallic surfaces in internal combustion engines which are in contact with such coolants become seriously corroded and that the corrosion becomes progressively worse as the pH of the coolant decreases. The recent tendency toward the use of aluminum in internal combustion engines, for instance, aluminum cylinder heads, aluminum water pumps and aluminum radiator cores, requires improved corrosion resistant antifreeze compositions which are capable of retarding the corrosion of metals which are in contact with such coolants. It has also been recognized in the art that corrosion resistant antifreeze compositions are most desirably single-phase systems which have good shelf stability such that when such concentrates reach the consumer prior to dilution with water to form the coolant composition, they contain the proper proportion of each phase and exhibit no gelation.

Numerous antifreeze compositions are known in the art which contain corrosion inhibitors and inhibitors for preventing decomposition of the alcohol utilized, for instance, ethylene glycol. These corrosion inhibitors and stabilizers for alcohol decomposition include both organic materials and inorganic materials. Illustrative of the organic materials that have been used in antifreeze compositions are guanadine, citrates, coal tar derivatives, petroleum bases, thiocyanates, peptones, phenols, thioureas, tannin, quinoline, morpholine, triethanolamine tartrates, glycol mono-ricinoleate, organic nitrites, mercaptans, sulfonated hydrocarbons, fatty oils, triazoles, mercaptobenzothiazoles, phenothiazine, and piperazine. Illustrative of the inorganic materials that have been used as corrosion inhibitors are sulfates, sulfides, fluorides, hydrogen peroxide, alkali metal chromates, nitrites, phosphates, borates, tungstates, molybdates, carbonates, and silicates.

Silicates, particularly alkali metal silicates and certain silicones and silicate-silicone copolymers, have been suggested for use in antifreeze compositions to retard the corrosion of metal surfaces of internal combustion engines as disclosed in U.S. Pat. Nos. 3,341,469; 3,337,496; 3,312,622; 3,198,820; 3,203,969; 3,248,329; 3,265,623; 3,121,692; and others. While it has been found that compositions containing metal silicates are effective corrosion inhibitors for the metals used in internal combustion engines, especially aluminum, the use of unbuffered or improperly pH buffered metallic silicates in antifreeze compositions is disadvantageous since these compositions have poor shelf life and/or use life, that is, a tendency to gel and form precipitates on standing prior to dilution of antifreeze concentrates by the consumer and especially during use as a coolant in an internal combustion engine. With respect to the water-soluble organo-silicones and water-soluble silicate-silicone copolymers which have been suggested for use in antifreeze compositions, it would be desirable in such systems if greater reserve alkalinity could be incorporated into the system thereby reducing the corrosion tendency.

In U.S. Pat. No. 2,832,742, there is disclosed an ethylene glycol base coolant for use in automobile radiators containing a corrosion inhibiting composition composed of equal parts of para tertiary butyl benzoic acid and a high molecular weight aliphatic carboxylic acid derived from a petroleum fraction. In U.S. Pat No. 2,197,774 there is disclosed the use of aromatic nitrohydroxy compounds wherein the nitro and hydroxy groups are directly attached to the aromatic nucleus or positioned only on a side chain. In Canadian No. 990,060 there is disclosed ethylene glycol based antifreeze compositions containing alkali metal silicates and alkali metal nitrites as corrosion inhibitors which are buffered at a pH of about 9 to about 10.5. There is no indication in any of these references that a hydroxybenzoic acid, such as parahydroxybenzoic acid or ortho hydroxybenzoic acid or mixtures thereof are effective pH buffers and corrosion inhibitors.

SUMMARY OF THE INVENTION

There are disclosed single-phase antifreeze and coolant concentrates comprising an alcohol selected from the group consisting of methanol, ethanol, propanol, ethylene glycol, diethylene glycol, triethylene glycol, propylene glycol and glycerol, a corrosion inhibiting amount of a water-soluble organosiloxane-silicate copolymer, and, as an organic basic pH buffer, a hydroxybenzoic acid or mixtures thereof. Preferably said alcohol is ethylene glycol and preferably the antifreeze concentrates are utilized as coolants upon dilution with water in internal combustion engines including those engines containing aluminum parts, for instance, aluminum cylinder heads. By the incorporation of the hydroxybenzoic acid of the invention into antifreeze compositions containing silicone-silicate copolymers, the tendency for the system to suffer a reduction in reserve alkalinity can be overcome. The organic pH buffers of the invention are especially advantageous as compared to the inorganic sodium borates and potassium borates.

DESCRIPTION OF THE PREFERRED EMBODIMENTS

The compositions of this invention contain a novel corrosion inhibiting, organic basic pH buffer which is a hydroxybenzoic acid or mixture thereof, preferably at least one of para hydroxybenzoic acid and ortho hydroxybenzoic acid. The meta form as well as the dihydroxybenzoic acids, i.e., 2,6- and 2,4-dihydroxybenzoic acids are also useful. The use of such buffers serves to maintain the pH of the antifreeze or coolant composition above a pH of about 9 to about 11, preferably a pH above about 9.5 to 10.5 in order to minimize corrosion which increases with the decrease of the pH of the antifreeze system below a pH of 9. Additionally, where a water-soluble organosiloxane-silicate copolymer is utilized as a component of the antifreeze composition, the buffering of the pH by the hydroxybenzoic acid compounds of the invention serves to maintain reserve alkalinity of the system, especially under long term use conditions. While many basic pH buffers have been used in the past in antifreeze compositions to maintain the pH above 7, the borate salt buffers preferred in the prior art antifreeze compositions such as sodium tetraborate, sodium orthoborate, and sodium metaborate are ineffective in maintaining reserve alkalinity during use conditions where the antifreeze composition contains water-soluble organosiloxane-silicate polymers as corrosion inhibitors.

The amount of the hydroxybenzoic acid basic pH buffer utilized in the compositions of the invention depends to some extent upon the desired shelf life of the antifreeze concentrate containing the buffer, the effectiveness of the particular hydroxybenzoic acid selected and the proportions of the other components of the antifreeze concentrate composition. Generally, amounts of the hydroxybenzoic acid compositions of the invention range from about 0.1 percent to about 1.5 percent by weight, preferably about 0.5 percent to about 1.2 percent by weight based upon the weight of the antifreeze concentrates of the invention. The use of lesser amounts of the buffers of the invention can result in a significant decrease in the pH of the coolant in a relatively short use time whereas the use of greater amounts of the buffer can involve the expenditure of needless amounts of money and possibly lead to insolubility problems. No advantage is generally gained by departing from the indicated proportions or from the use of additional basic buffer materials known in the prior art.

The alcohols that are suitable for use in preparing the antifreeze and coolant compositions of the invention include both monohydric alcohols and polyhydric alcohols. Thus, methanol, ethanol, and propanol as well as ethylene glycol, diethylene glycol, triethylene glycol, propylene glycol and glycerol are useful. Mixtures of these alcohols are also useful in the compositions of this invention. Ethylene glycol is an especially useful alcohol. The coolant concentrates of the invention are useful as a heat transfer medium both undiluted or upon dilution with relatively large amounts of water. The antifreeze concentrates of the invention are adapted to economical shipment and storage; the concentrate being shipped to the point where it is to be used in diluted form as a coolant. Water imparts desirable properties to both the concentrate and coolant compositions of the invention since small amounts of water tend to lower the freezing point of the concentrate composition and large amounts of water improve the heat transfer properties of the coolant compositions. The antifreeze concentrate compositions of the invention generally contain about 0.1 percent by weight to about 10 percent by weight of water based upon the weight of the concentrate. The concentrates preferably contain about 1 to about 5 percent of water based upon the weight of the concentrate. Generally the diluted coolant concentrates contain about 25 percent to about 90 percent by weight of water based upon the total weight of the concentrate. The pH of both the antifreeze concentrate compositions of the invention and the diluted coolants generally should be maintained at greater than about 9 to about 11 in order that corrosion of metals with which the compositions come in contact will be minimized. Any alkali such as the alkali metal hydroxides can be used to adjust pH.

Various additives known in the prior art can be added to the antifreeze concentrate compositions of the invention or to the coolant compositions in order to impart special properties thereto. For instance, antifoam agents, identifying dyes, pH indicators, conventional corrosion inhibitors and alcohol or glycol oxidation inhibitors known in the prior art, sealants which prevent leakage of the coolant from the coolant system, anticreep agents which prevent seepage of the coolant into the crankcase of the internal combustion engine and the like can be added to the antifreeze concentrates of the invention or the diluted coolant compositions of the invention. It should be noted that, while the antifreeze and coolant compositions of this invention are single-phase compositions, the addition of various additives insoluble in the alcohol or in water can render these compositions two-phase (for instance, the addition of an insoluble sealant additive which prevents leakage of the coolant from the cooling system). While the antifreeze concentrates and coolant compositions of this invention are particularly suitable for use either alone or upon dilution with water as internal combustion engine coolants, the compositions can be advantageously employed in other applications such as heat transfer fluids or hydraulic fluids.

The water-soluble organosiloxane-silicate copolymers are known in the art for use as components of antifreeze concentrate compositions in a corrosion inhibiting amount, preferably in the amount of from 0.01 percent to 10 percent by weight based upon the weight of said concentrate compositions. These copolymers are more fully described in U.S. Pat. No. 3,337,496, and consist essentially of:

(1) from 0.1 to 99.9 parts by weight of (a) at least one member selected from the group consisting of (a) siloxane groups represented by the formula:

  (1)

wherein R is a member selected from the group consisting of the methyl, ethyl, phenyl and vinyl groups and (b) siloxane groups represented by the formula:

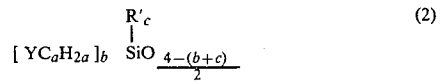  (2)

wherein Y is a member selected from the group consisting of the cyano group, CH$_2$(OH)CH(OH) group, CH$_2$(OH)CH(OH)CH$_2$ group,

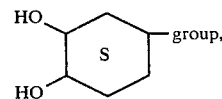

CH$_2$(OH)CH(OH)CH$_2$O—group and R''(OCH$_2$CH$_2$)$_n$(OC$_3$H$_6$)$_m$O—group, wherein R'' is a member selected from the group consisting of the monovalent hydrocarbons and the hydrogen atom, n has a value of at least 1, m has a value from 0 to 20 inclusive, the ratio of n to m is at least 2 to 1, a has a value of at least 2, C$_a$H$_{2a}$ is an alkylene group, the group represented by Y is separated from the silicon atom by at least two successive carbon atoms, b has a value of from 1 to 3 inclusive, R' is a monovalent hydrocarbon group, c has a value from 0 to 2 inclusive, (b+c) has a value from 1 to 3 inclusive; and (2) from 0.1 to 99.9 parts by weight of at least one silicate group represented by the formula:

$$\left[\frac{M_{\frac{1}{d}}O}{}\right]_e SiO_{\frac{4-e}{2}} \qquad (3)$$

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer.

Preferably, the water-soluble organosiloxanesilicate copolymers contain from 15 to 45 parts by weight based on 100 parts by weight of the copolymer of groups represented by (a) and groups from member (b) and from 55 to 85 parts by weight based upon 100 parts by weight of the copolymer of metal silicate groups.

Siloxanes illustrative of those represented by the generic formulas (1) and (2) are the methylsiloxy, ethylsiloxy, phenylsiloxy, and vinylsiloxy siloxanes. Representative water-soluble silicates under the generic formula above are the various monovalent and polyvalent organic and inorganic alkali metal silicates. Representative alkali metal silicates are the sodium, potassium lithium, and rubidium metasilicates, orthosilicates, and disilicates.

The polymers utilized in the invention are generally useful in combination with the hydroxybenzoic acid pH buffer and corrosion inhibitors of the invention in the protection of metals and alloys that are used in industrial heat exchangers, i.e., internal combustion engines, especially aluminum, iron and copper as well as alloys such as brass, bronze, solder, and steel and are thus particularly useful for inhibiting the corrosion that normally occurs in cooling systems of internal combustion engines in contact with aqueous alcohol coolant compositions such as ethylene glycol-based compositions. Further details of the preparation and additional illustrative examples of these polymers can be found in U.S. Pat. No. 3,341,469 and U.S. Pat. No. 3,337,496, both incorporated herein by reference.

The reserve alkalinity of an antifreeze composition as referred to elsewhere in the specification is defined as a measure of the ability of the antifreeze composition to resist or decrease in pH due to the presence of acidic materials such as are produced by the decomposition of ethylene glycol. Reserve alkalinity is determined by titrating a sample (about 10 cc) of the composition with 0.1 Normal aqueous hydrochloric acid solution. The reserve alkalinity is computed by calculating the number of milliliters of acid that would be required to neutralize 100 milliliters of the composition from the number of milliliters of acid actually required to neutralize the sample. When not otherwise specified throughout this specification and claims, temperatures are given in degrees centigrade and parts, percentages and proportions are by weight.

The embodiments of the invention in which an exclusive property or privilege is claimed are defined as follows:

1. A single-phase antifreeze or coolant concentrate consisting essentially of an alcohol is selected from the group consisting of methanol, ethanol, propanol, diethylene glycol, triethylene glycol, propylene glycol, glycerol and ethylene glycol, a water-soluble organosiloxanesilicate copolymer corrosion inhibitor, and at least one hydroxybenzoic acid pH buffer and corrosion inhibitor capable of buffering the pH in the range above about 9 to about 11 wherein said copolymer is present in the amount of from 0.01 percent to 10 percent by weight based upon the weight of said concentrate and consists essentially of:

(1) from 0.1 to 99.9 parts by weight of at least one member selected from the group consisting of (a) siloxane groups represented by the formula:

$$RSiO_{1.5}$$

wherein R is a member selected from the group consisting of the methyl, ethyl, phenyl and vinyl groups and (b) siloxane groups represented by the formula:

$$[YC_aH_{2a}]_b\overset{R'_c}{\underset{|}{Si}}O_{4-\frac{(b+c)}{2}}$$

wherein Y is a member selected from the group consisting of the cyano group, $CH_2(OH)CH(OH)$ group, $CH_2(OH)CH(OH)CH_2$ group,

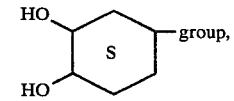

group, $CH_2(OH)CH(OH)CH_2O$—group and $R''(OCH_2CH_2)_n(OC_3H_6)_mO$—group, wherein $R''$ is a member selected from the group consisting of the monovalent hydrocarbons and the hydrogen atom, n and m are integers and n has a value of at least 1, m has a value from 0 to 20 inclusive, the ratio of n to m is at least 2 to 1, a is an integer and has a value of at least 2, $C_aH_{2a}$ is an alkylene group, the group represented by Y is separated from the silicon atom by at least two successive carbon atoms, b is an integer and has a value of from 1 to 3 inclusive, R' is a monovalent hydrocarbon group, c is an integer and has a value from 0 to 2 inclusive, (b+c) has a value from 1 to 3 inclusive; and (2) from 0.1 to 99.9 parts by weight of at least one silicate group represented by the formula:

$$\left[\frac{M_1O}{d}\right]_e SiO_{\frac{4-e}{2}}$$

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer wherein said pH buffer is at least one of para hydroxybenzoic acid and ortho hydroxybenzoic acid and is present in the amount of about 0.1 percent to about 1.5 percent by weight based upon the weight of said concentrate.

2. The composition of claim 1 wherein said composition additionally contains about 0.1 percent by weight to about 10 percent by weight of water all based upon the weight of said concentrate.

3. The composition of claim 2 wherein said alcohol is ethylene glycol and said hydroxybenzoic acid pH buffer is para hydroxybenzoic acid.

4. A coolant composition comprising the coolant concentrate of claim 2 and 25 percent to about 90 percent by weight of water based upon the weight of said concentrate.

* * * * *